United States Patent [19]

Sobky

[11] 4,249,483
[45] Feb. 10, 1981

[54] AUTOMATIC MOIST PET FOOD SERVER

[76] Inventor: Reda Z. Sobky, 1049 Keith Ave., Berkeley, Calif. 94708

[21] Appl. No.: 72,944

[22] Filed: Sep. 6, 1979

[51] Int. Cl.³ .................................................. A01K 5/02
[52] U.S. Cl. ................................................. 119/51.12
[58] Field of Search ............... 119/51.11, 51.12, 51.13, 119/51.14, 51.15, 51.5, 51

[56] References Cited

U.S. PATENT DOCUMENTS

| | | | |
|---|---|---|---|
| 2,528,742 | 11/1950 | Coffing | 119/51.12 |
| 3,658,036 | 4/1972 | Caracappa | 119/51.13 |
| 3,826,231 | 7/1974 | Crawford et al. | 119/51.12 |
| 4,077,360 | 3/1978 | Figlia | 119/51.12 |

Primary Examiner—Jay N. Eskovitz

[57] ABSTRACT

A device for serving fresh moist pet food and/or water at preselected time intervals is disclosed. A tray is provided which has multiple upwardly opening compartments disposed circumferentially about a central vertical axis. The compartments contain moist pet food and also water if desired. A circumferentially continuous sheet of wrapping material overlies the compartments of the tray and seals the contents in the compartments so that the contents remain fresh and moist. The compartments are serially exposed at preselected time intervals, and the wrapping material is removed from the exposed compartments as they are exposed, so that moist pet food and/or water is provided at selected intervals.

10 Claims, 3 Drawing Figures

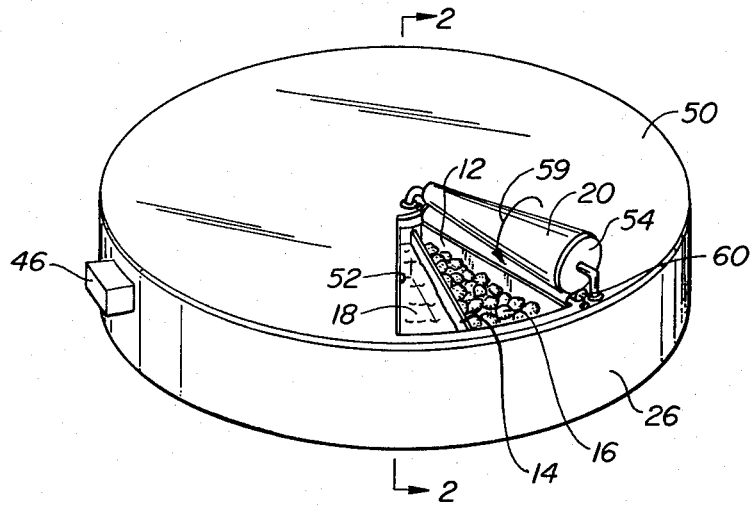
FIG._1.
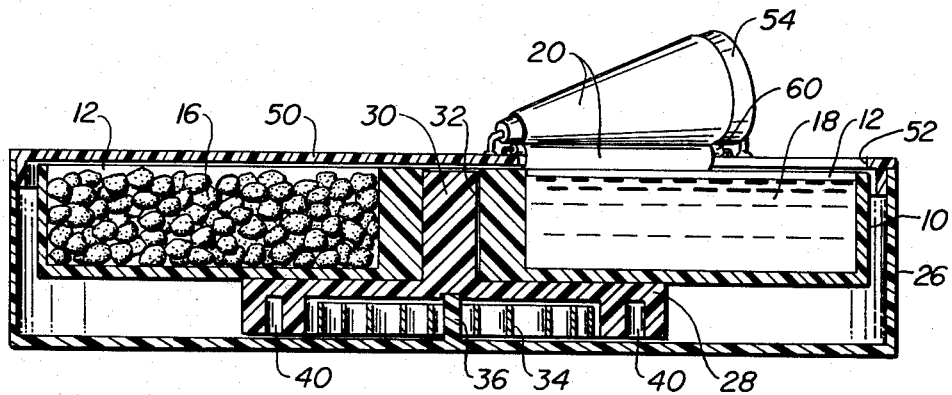
FIG._2.

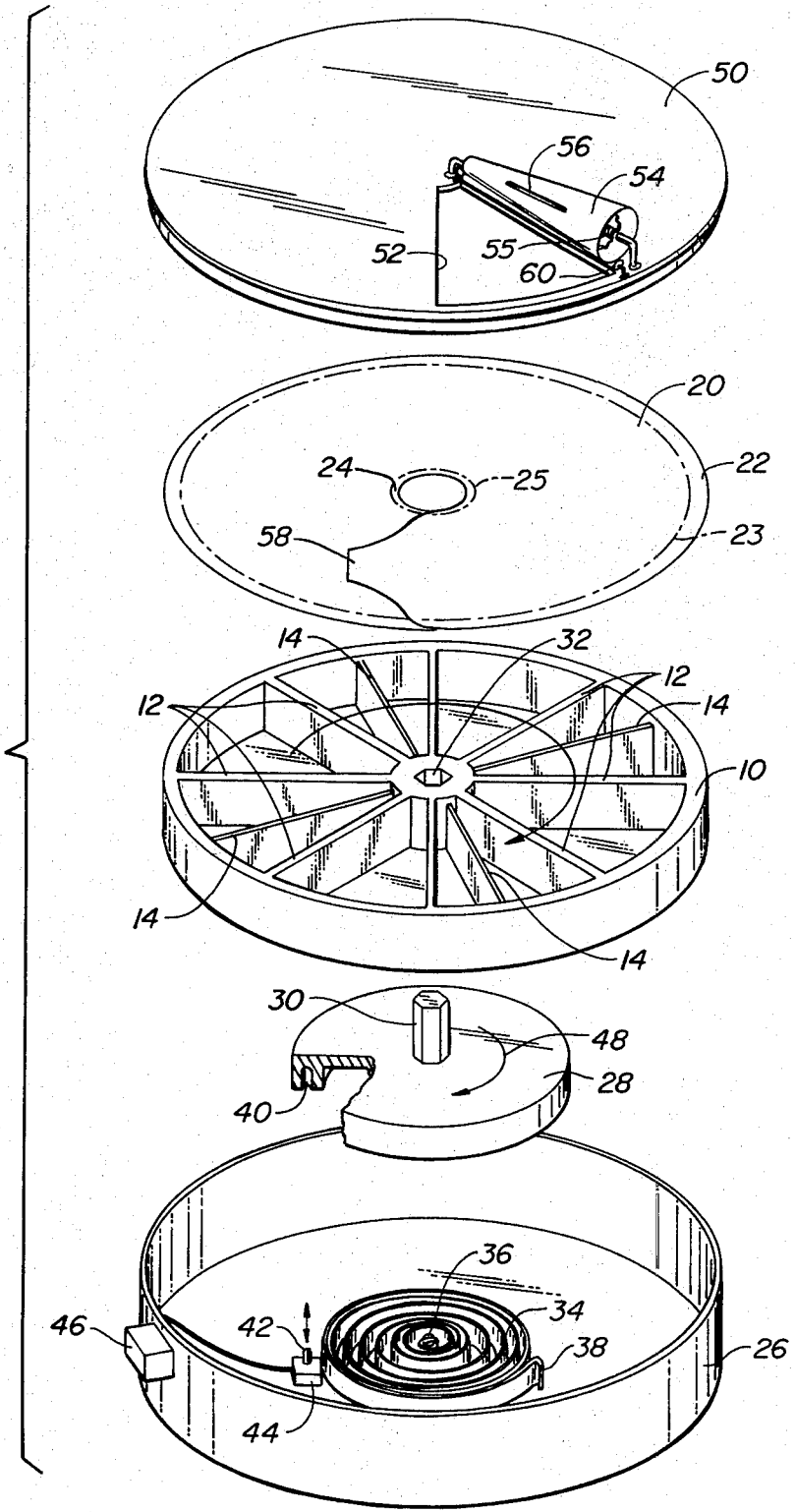
FIG._3.

AUTOMATIC MOIST PET FOOD SERVER

BACKGROUND OF THE INVENTION

The present invention relates to an automatic pet food server, and in particular to a device which automatically provides fresh, moist pet food and water for a pet on a periodic basis.

A substantial portion of the population own pets which must be supplied with fresh food and water on a daily or twice daily basis. Unfortunately, because of vacations and the like, it is not always possible for the owner of the pet to provide pet food in a timely fashion. The usual alternatives are to board the pet, which is quite expensive and often traumatic to the pet, or impose on neighbors and friends.

Because of the above problem, a wide variety of devices have been developed for automatically providing a supply of pet food for a pet on a periodic basis. A number of these, such as U.S. Pat. No. 2,528,742 to Coffing, U.S. Pat. No. 3,658,036 to Caracappa, and U.S. Pat. No. 3,826,231 to Crawford et al., employ circular compartmentalized trays which are periodically exposed or dumped to provided food for the pet. However, such devices are usually only capable of providing dry pet food, which many pets will not accept, and do not provide water. Those automatic pet feeders which have been designed to dispense moist pet food have been too complex to be practical, as illustrated in U.S. Pat. No. 4,077,360 to Figlia.

SUMMARY OF THE INVENTION

The present invention provides a device for dispensing fresh moist pet food and/or water at preselected time intervals. A tray is provided which has multiple upwardly opening compartments disposed circumferentially about a central vertical axis. The compartments contain moist pet food and also water if desired. A circumferentially continous sheet of wrapping material overlies the compartments of the tray and seals the contents in the compartments so that the contents remain fresh and moist. The compartments are serially exposed at preselected time intervals, and the wrapping material is removed from the exposed compartments as they are exposed, so that moist pet food and/or water is provided at selected intervals.

In the preferred embodiment of the present invention, certain compartments are divided into two sub-compartments containing moist pet food and water respectively so that fresh water can also be provided to the pet. In this embodiment, the compartments are serially exposed through a cutout portion of a cover. A spring biased spool is mounted on the cover and takes up the wrapping material from the compartments as they are exposed. A coil spring moves the tray relative to the cover, and a catch mechanism periodically dislodges to allow periodic movement of the tray.

The present invention thus provides a simple and straightforward mechanism for periodically dispensing pet food. Moreover, the present invention incorporates a system for sealing the contents of the compartments until they are to be used. As a result, moist pet food and/or water can be stored in the compartments, and remains fresh until it is to be consumed by the pet. The trays themselves with the wrapping thereon can be provided in a modular fashion with the pet food and water already stored therein.

The novel features which are chareacteristic of the invention, as to organization and method of operation, together with further objects and advantages thereof will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a perspective view of a preferred embodiment of the pet food server of the present invention;

FIG. 2 is a cross-sectional view taken along lines 2-2 of FIG. 1;

FIG. 3 is an exploded view of the preferred embodiment.

DESCRIPTION OF THE PREFERRED EMBODIMENT

The construction of the preferred embodiment of the pet food server of the present invention is illustrated by way of reference to FIGS. 1-3 in combination.

A tray 10 includes a plurality of wedge-shaped compartments defined by dividers 12. Between every other set of dividers, subdividers 14 are provided so that alternate compartments are divided into a pair of subcompartments. In each compartment without a subdivider 14, moist pet food 16 can be inserted. In those compartments with a subdivider, a combination of pet food 16 and water 18 can be supplied in the respective subcompartments.

A flexible sheet of wrapping paper 20 is sealed over the top of tray 10. Sheet 20 includes an outer border 22 and an inner border 24 defined by scored lines 23, 25 respectively. Borders 22 and 24 overlie and are attached to the outer edge and inner hub of trap 10 Sheet 20 is air impervious so that the contents of the compartments in tray 10 remain fresh.

Tray 10 is placed within a base 26 overlying a drive member 28. Drive member 28 has an upwardly projecting hexagonal shaft 30 engaging a corresponding hexagonal aperture 32 in tray 10 so that the drive member is nonrotatably attached to the tray. A coil spring 34 is located in base 26, and attached to a post 36 at the center of the base. Coil spring 34 terminates in a book shaped portion 38.

When drive member 28 is inserted within base 26, it engages the hook shaped end 38 of coil spring 34. Drive member 28 is then rotated against the force of the spring, and after it is spring loaded in this fashion, one of the apertures 40 on the underside of the member is engaged by a peg 42.

Peg 42 is controlled by a solenoid 44. Solenoid 44 is in turn controlled by a timer 46 on the outside of base 26. Timer 46 is set to momentarily retract peg 42 at preselected time increments. When peg 42 is momentarily retracted, spring 34 will rotate drive member 28 and attached tray 10 in the direction indicated by arrow 48. Apertures 40 are disposed about the underside of drive member 28 so that each retraction of peg 42 allows member 28 to rotate through an arc defined by adjacent dividers 12.

A cover 50 attaches to the top of base 26 overlying tray 10. Cover 50 includes a cutout portion 52 having a wedge shape corresponding to the shape of the compartments defined by dividers 12. Accordingly, when cover 50 is placed on top of base 26, one of the compartments will be exposed through cutout portion 52.

A tapered spool 54 with an internal spring 55 is mounted on top of cover 50 adjacent one side of cutout portion 52. A slot 56 is formed in the surface of tapered spool 54, and is adapted to receive a tab 58 on sheet material 20. Spool 54 is spring loaded, and a small idler roller 60 is provided so that sheet material 28 between perforations 23, 25 is taken up by the spool as tray 10 revolves. The tapered configuration of spool 54 accounts for the fact that more material must be taken up toward the outside of the tray than the inside.

In operation, a tray 10 having its compartments filled with moist dog food and water is provided, with sheet material 20 sealing the contents of the tray. Tray 10 with its attached sheet 20 is placed on drive member 28. Drive member 28 and tray 10 are placed in base 26 and rotated to load spring 34. When the spring has been sufficiently loaded, one of the apertures 40 is engaged by peg 42.

With tray 10 inserted in base 26 and drive member 28 spring loaded, cover 50 is placed on top of the base with cutout portion 52 lying immediately clockwise to the first compartment to be utilized. Spool 54 is rotated so that spring 55 is loaded, and tab 58 inserted in slit 56. Spool 54 is then allowed to rotate as illustrated by arrow 59 to take up tab 58.

Timer 46 is set to momentarily retract peg 42 at preselected time intervals. When peg 42 is retracted, spring 34 causes rotation of drive member 28 in attached tray 10 in a clockwise direction. Peg 42 becomes engaged with the next aperture 40, stopping the movement of tray 10 in a position which exposes the next compartment in series. As tray 10 moves, spring loaded spool 54 takes up the sheet material 20, which separates at perforations 23, 25. Fresh moist pet food and water are supplied to the pet each time the tray rotates to expose a new compartment.

While a preferred embodiment of the present invention has been illustrated in detail, it is apparent that modifications and adaptations of that embodiment will occur to those skilled in the art. However, it is to be expressly understood that such modifications and adaptations are within the spirit and scope of the present invention, as set forth in the following claims.

What is claimed is:

1. A device for dispensing moist pet food at preselected time intervals comprising:
   a tray having multiple upwardly opening compartments disposed circumferentially about a central vertical axis and containing moist pet food;
   a circumferentially continuous sheet of wrapping material overlying the compartments of the tray and sealing the contents in said compartments so that the contents remain moist;
   means for serially exposing the compartments at preselected time intervals; and
   means for removing the wrapping material from the exposed compartments as they are exposed so that moist pet food is provided at selected intervals for the pet.

2. The device of claim 1 wherein said exposing means comprises a cover overlying the tray and having a cutout portion exposing the compartments.

3. The device of claim 2 wherein said removing means comprises a spool fastened to the cover proximate the cutout portion thereof, the sheet of wrapping material being wound on the spool as the compartments are exposed.

4. The device of claim 3 wherein the spool is spring-biased to automatically take in the wrapping material as the compartments are exposed.

5. The device of claim 2 wherein the cover is stationary, and the tray periodically moves relative to the cover.

6. The device of claim 5 and additionally comprising spring means for moving the tray.

7. The device of claim 6 wherein the exposing means includes a catch, and means for periodically dislodging the catch to allow movement of the tray.

8. A device for dispensing moist pet food at preselected time increments comprising:
   a tray having multiple upwardly opening compartments disposed circumferentially about a central vertical axis and containing moist pet food;
   a circumferentially continuous sheet of wrapping material overlying the compartments of the tray and sealing the contents in said compartments so that the contents remain moist;
   a cover overlying the tray and having a cutout portion exposing one compartment of the tray;
   means for causing relative rotational movement between the tray and the cover at preselected time increments to serially expose the compartments through the cutout portion of the cover; and
   a spool fastened to the cover proximate the cutout portion thereof, the sheet of wrapping material being wound on the spool as the compartments are exposed to remove the wrapping material therefrom.

9. The device of claim 1 or 8 wherein each compartment has a divider separating the compartment into subcompartments for water and moist pet food.

10. A device for dispensing moist pet food at preselected time increments comprising:
    a tray having multiple upwardly opening compartments disposed circumferentially about a central vertical axis, each said compartment including a subdivider dividing the compartments into subcompartments for water and moist pet food respectively;
    a circumferentially continuous sheet of wrapping material overlying the compartments of the tray and sealing the contents in said compartments so that the contents remain moist;
    a cover overlying the tray and having a cutout portion exposing one compartment of the tray;
    a coil spring attached to the tray and exerting a force on the tray tending to rotate the tray;
    means for allowing the tray to rotate responsively to the coil spring at preselected intervals through an arc sufficient to expose a new compartment through the cutout portion of the cover; and
    a spool fastened to the cover proximate the cutout portion thereof, the sheet of wrapping material being wound on the spool as the compartments are exposed so that moist pet food and water are provided at selected intervals for the pet.

* * * * *